(12) United States Patent
Kang et al.

(10) Patent No.: US 8,724,179 B2
(45) Date of Patent: May 13, 2014

(54) DATA TRANSMISSION DEVICE AND METHOD THEREOF

(75) Inventors: Hyung-jong Kang, Seoul (KR); Kang-hoon Lee, Yongin-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 998 days.

(21) Appl. No.: 11/003,975

(22) Filed: Dec. 6, 2004

(65) Prior Publication Data

US 2005/0141564 A1 Jun. 30, 2005

(30) Foreign Application Priority Data

Dec. 24, 2003 (KR) .................. 2003-96778

(51) Int. Cl.
- H04N 1/00 (2006.01)
- H04N 1/32 (2006.01)
- G06F 3/12 (2006.01)
- G06F 3/048 (2013.01)
- G06K 15/02 (2006.01)

(52) U.S. Cl.
USPC .......... 358/400; 358/1.15; 358/407; 358/468; 358/523; 715/700; 715/748

(58) Field of Classification Search
USPC ......... 358/400, 401, 403, 404, 407, 440, 468, 358/474, 1.15, 1.16, 523; 379/100.05, 379/100.06, 100.09, 100.13, 102.02; 709/201, 217
See application file for complete search history.

(56) References Cited

U.S. PATENT DOCUMENTS

| | | | | |
|---|---|---|---|---|
| 5,552,901 A * | 9/1996 | Kikuchi et al. | ................ | 358/468 |
| 5,579,126 A * | 11/1996 | Otsuka | .................... | 358/403 |
| 5,754,310 A * | 5/1998 | Aoki et al. | ................ | 358/406 |
| 5,872,901 A * | 2/1999 | Konno et al. | ................ | 358/1.15 |
| 5,933,478 A * | 8/1999 | Ozaki et al. | ................ | 379/93.24 |
| 6,072,599 A * | 6/2000 | Oba et al. | ................ | 358/444 |
| 6,256,114 B1 * | 7/2001 | Yoshikawa | ................ | 358/407 |
| 6,266,160 B1 * | 7/2001 | Saito et al. | ................ | 358/407 |
| 6,266,162 B1 * | 7/2001 | Okamura et al. | ................ | 358/468 |
| 6,323,962 B1 * | 11/2001 | Itoh et al. | ................ | 358/468 |

(Continued)

FOREIGN PATENT DOCUMENTS

| | | |
|---|---|---|
| JP | 07-056828 | 3/1995 |
| JP | 09-051396 | 2/1997 |

(Continued)

OTHER PUBLICATIONS

Chinese Office Action dated Jul. 14, 2006.

Primary Examiner — King Poon
Assistant Examiner — Beniyam Menberu
(74) Attorney, Agent, or Firm — Stanzione & Kim, LLP (57) ABSTRACT

A data transmission device and a method thereof. A fax driving unit converts a document into a fax data recognizable by a first multifunction machine, and creates a fax event including a fax information event which instructs to transmit the converted fax data to a second office machine and a fax number of the second office machine. A printer spooler spools the converted fax data and outputs the spooled fax data and the fax information event. A communication port transmits the spooled fax data and the fax information event to the first multifunction machine. The first multifunction machine transmits the fax data to the second multifunction machine based on the transmitted fax information event. Accordingly, data communication errors are prevented which occur between a host personal computer and a multifunction machine while transmitting the fax data.

20 Claims, 8 Drawing Sheets

(56) References Cited

U.S. PATENT DOCUMENTS

| | | | |
|---|---|---|---|
| 6,380,967 B1 * | 4/2002 | Sacca | 348/14.01 |
| 6,437,882 B1 * | 8/2002 | Kanematsu et al. | 358/437 |
| 6,452,943 B1 * | 9/2002 | Furuya | 370/468 |
| 6,552,826 B2 * | 4/2003 | Adler et al. | 358/442 |
| 6,633,413 B1 * | 10/2003 | Schlank et al. | 358/468 |
| 6,693,729 B1 * | 2/2004 | Bloomfield | 358/402 |
| 6,704,775 B1 * | 3/2004 | Sato et al. | 709/219 |
| 6,741,366 B2 * | 5/2004 | Ishikawa et al. | 358/1.13 |
| 6,804,017 B1 * | 10/2004 | Itoh | 358/1.14 |
| 7,102,782 B2 * | 9/2006 | Nagaoka | 358/1.15 |
| 7,113,293 B2 * | 9/2006 | Mori et al. | 358/1.13 |
| 7,199,906 B1 * | 4/2007 | Tamura | 358/400 |
| 2001/0014149 A1 * | 8/2001 | Ooi et al. | 379/114.02 |
| 2001/0033642 A1 * | 10/2001 | Abrishami et al. | 379/100.01 |
| 2001/0035977 A1 * | 11/2001 | Adler et al. | 358/1.15 |
| 2002/0051181 A1 * | 5/2002 | Nishimura | 358/1.15 |
| 2002/0093923 A1 * | 7/2002 | Bouet | 370/328 |
| 2002/0156923 A1 * | 10/2002 | Tanimoto | 709/246 |
| 2002/0174214 A1 * | 11/2002 | Carl et al. | 709/224 |
| 2002/0199044 A1 * | 12/2002 | Futterman | 710/62 |
| 2003/0225946 A1 * | 12/2003 | Allen et al. | 710/8 |
| 2004/0236795 A1 * | 11/2004 | Johnston | 707/200 |
| 2005/0003859 A1 * | 1/2005 | Morisaki et al. | 455/557 |
| 2005/0015428 A1 * | 1/2005 | Ferlitsch | 709/200 |
| 2006/0132846 A1 * | 6/2006 | Dicken et al. | 358/3.01 |
| 2006/0136964 A1 * | 6/2006 | Diez et al. | 725/37 |

FOREIGN PATENT DOCUMENTS

| | | |
|---|---|---|
| JP | 09-069911 | 3/1997 |
| JP | 10-093756 | 4/1998 |
| JP | 11-088590 | 3/1999 |
| JP | 2000-224366 | 8/2000 |
| KR | 1997-48132 | 9/1997 |

* cited by examiner

| FAX INFORMATION | ☒ |

SENDER
- NAME
- COMPANY
- FAX NUMBER

TRANSMIT

CANCEL

MODEM SETUP

RECIPIENT
- NAME
- COMPANY
- FAX NUMBER

DATA TRANSMISSION DEVICE AND METHOD THEREOF

CROSS-REFERENCE TO RELATED APPLICATIONS

This application claims the benefit of Korean Patent Application No. 2003-96778, filed on Dec. 24, 2003 in the Korean Intellectual Property Office, the disclosure of which is incorporated herein by reference in its entirety.

BACKGROUND OF THE INVENTION

1. Field of the Invention

The present general inventive concept relates generally to a data transmission device and a method thereof. More particularly, the present general inventive concept relates to a data transmission device capable of preventing data communication errors during fax data transmission between a host personal computer and a multifunction machine, and a method thereof.

2. Description of the Related Art

A facsimile (fax) machine transmits a particular document to an external fax machine by applying a public switched telephone network (PSTN). Recently, fax machines and host personal computers (refer to as PCs hereinafter) are generally used to perform a function to transmit a document written in the PC using the fax machine.

Figure 1:
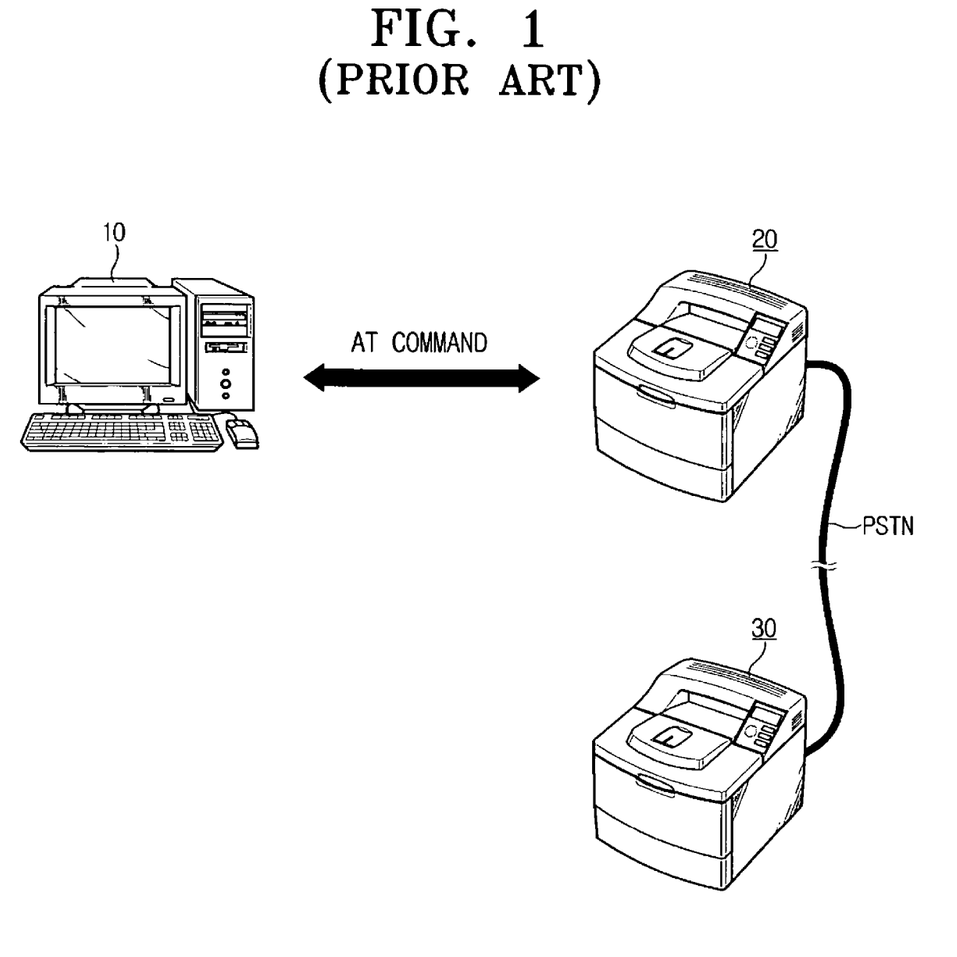
FIG. 1 is a schematic view illustrating a conventional fax system.

FIG. 1 is a schematic view illustrating a conventional fax system.

Referring to FIG. 1, the fax system includes a PC 10, a first fax machine 20, and a second fax machine 30. The PC 10 has an application, a fax driver, and a modem driver.

To transmit a document written in the application to the second fax machine 30, the fax driver converts the written document into fax data. The modem driver communicates with the first fax machine 20 using an attention (AT) command which is a data transmission protocol between the PC 10 and the first fax machine 20.

The modem driver requests the first fax machine 20 to dial into the second fax machine 30 using the AT command, and receives status information of the second fax machine 30 through the AT command. The data communication through the AT command proceeds until the fax data transmission is completed. The reception of the fax data from the second fax machine is performed in the similar manner.

However, the conventional fax system has drawbacks in that errors relating to the AT command frequently arise between the modem driver and the first fax machine 20. Since the errors arise onto the AT command which is responsible for transmitting the fax data between the modem driver and the first fax machine 20, the fax data transmission is interrupted between the first and second fax machines 20 and 30. That is, the fax data transmission may be interrupted if the AT command is not accurately transmitted or the AT command transmission is interrupted.

SUMMARY OF THE INVENTION

The present general inventive concept is to provide a data transmission device enabling an efficient transmission of fax data by preventing data communication errors between a host personal computer and a fax machine, and a method thereof.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a data transmission device including a fax driving unit to convert a certain document into fax data recognizable by a first office machine and to create a fax event including a fax information event which instructs the first office machine to transmit the converted fax data to a second office machine, and a fax number of the second office machine, a spooler to spool the converted fax data and to output the spooled fax data and the fax information event, and a communication interface unit to transmit the spooled fax data and the fax information event to the first office machine which is communicatingly connected with the communication interface unit. The first office machine transmits the fax data to the second office machine based on the transmitted fax information event.

The data transmission device may further include a communication monitor to confirm a transmission status event of the fax data transmitted from the first office machine to the second office machine by periodically monitoring the communication interface unit, a window creation unit to create a user interface window which shows the confirmed transmission status event, and a display unit to display the created user interface window.

The first office machine may periodically provide the transmission status event to the communication interface unit when the fax data begins to be transmitted to the second office machine.

The fax information event may further include at least one of a total amount of the fax data, a fax number of the first office machine, and a sender name and a recipient name.

The foregoing and/or other aspects and advantages of the present general inventive concept may also be achieved by providing a data transmission method including converting a document into fax data recognizable by a first office machine, creating a fax event including a fax information event which instructs to transmit the converted fax data to a second office machine and a fax number of the second office machine, spooling the converted fax data and outputting the spooled fax data and the created fax information event to the first office machine, transmitting the spooled fax data and the fax information event to the first office machine which is communicatingly connected, and transmitting the fax data to the second office machine based on the transmitted fax information event.

The spooling of the converted fax data is performed in a spooler.

The data transmission method may further include periodically monitoring a reception of a transmission status event indicating the transmission status of the fax data which is transmitted from the first office machine to the second office machine, creating a user interface window based on the transmission status event confirmed through the monitoring, and displaying the created user interface window.

The foregoing and/or other aspects and advantages of the present general inventive concept may also be achieved by providing a data transmission device to load fax data transmitted from a second office machine to a first office machine, the data transmission device including a communication interface unit communicatingly connected with the second office machine to receive from the first office machine a request event which requests a fax data loading, and a loading status event which notifies a loading status of the fax data, a communication monitor to allow the fax data loading when the reception of the request event is confirmed by periodically monitoring the communication interface unit, and to confirm the loading status event which is received after a predetermined time, a window creation unit to create a user interface window to indicate the loading status of the fax data based on the confirmed loading status event, and a display unit to display the created user interface window.

The foregoing and/or other aspects and advantages of the present general inventive concept may also be achieved by providing a data transmission method of loading certain fax data which is transmitted from a second office machine to a first office machine which is communicatingly connected with the second office machine, the method including periodically monitoring a reception of a request event which requests a loading of the fax data, allowing the fax data loading when the reception of the request event is confirmed through monitoring that the request event is received from the first office machine, confirming a loading status event which instructs a loading status of the fax data received from the first office machine after a predetermined time, and creating a user interface window which shows the loading status of the fax data based on the confirmed loading status event, and displaying the created user interface window.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawing figures, wherein like reference numerals refer to the like elements throughout. The embodiments are described below in order to explain the present general inventive concept by referring to the drawing figures.

Figure 2:
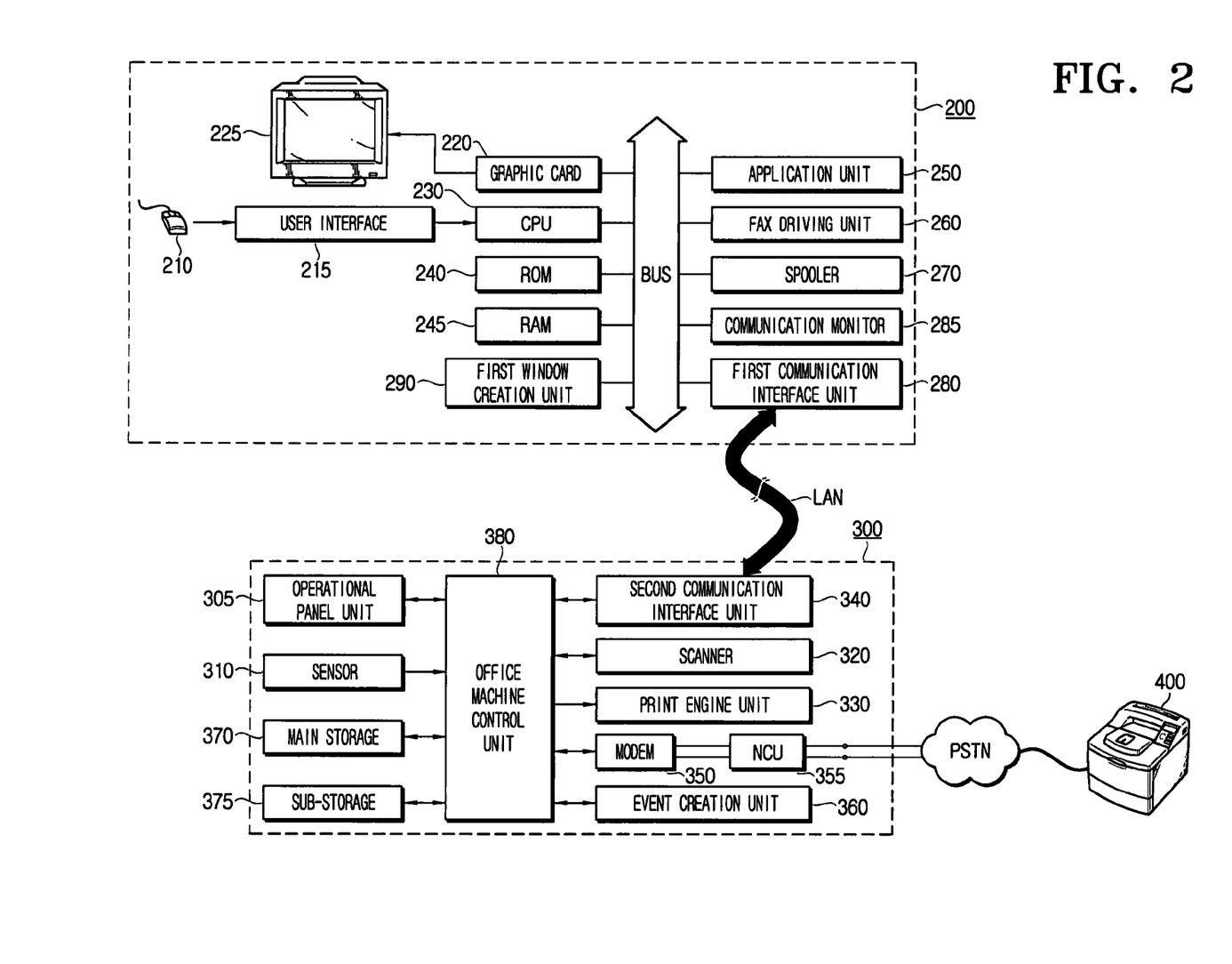
FIG. 2 is a schematic block diagram illustrating a fax system to transmit fax data according to an embodiment of the present general inventive concept.

FIG. 2 is a schematic block diagram illustrating a facsimile (fax) system capable of transmitting fax data according to an embodiment of the present general inventive concept.

Referring to FIG. 2, the fax system may include a user terminal 200, a first office machine 300, and a second office machine 400. The user terminal 200 creates and transmits the fax data to the first office machine 300. The user terminal 200 applies a fax data transmission device to transmit and/or receive the fax data according to an embodiment of the present general inventive concept. An example of the user terminal 200 is a personal computer (PC) provided with a fax driver.

The first and second office machines 300 and 400 may be a fax machine or a multifunction machine providing a fax service. The first office machine 300 transmits the fax data received from the user terminal 200 to the second office machine 400, and transmits the fax data received from the second office machine 400 to the user terminal 200. For the transmission, the fax driver of the user terminal 200 and the first office machine 300 applies a fax protocol which is separately set for the data communication between the user terminal 200 and the first office machine 300 so that the fax data is transmitted without using a modem driver (not shown) to generate a standard protocol such as an attention (AT) command.

The user terminal 200 and the first office machine 300 are interconnected via a local area network (LAN) and a hub. The first and second office machines 300 and 400 are interconnected via a public switched telephone network (PSTN).

The user terminal 200 capable of transmitting the fax data may include a user input unit 210, a user interface 215, a graphic card 220, a display unit 225, a central processing unit (CPU) 230, a read only memory (ROM) 240, a random access memory (RAM) 245, an application unit 250, a fax driving unit 260, a spooler 270, a first communication interface unit 280, a communication monitor 285, and a first window creation unit 290. A bus is a data transmission path between the above components.

The user input unit 210 outputs a signal to request a function provided by the user terminal 200, and may use a keyboard, a mouse and a touch panel. The user interface 215 outputs the output signal from the user input unit 210 to the CPU 230. The user input unit 210 may output to the CPU 230 a fax request command to request for a particular document to be transmitted to an external fax machine.

The graphic card 220 processes a general video signal into a displayable signal and outputs the processed signal to the display unit 225. Specifically, the graphic card 220 signal-processes a fax setup menu of the fax driving unit 260 and a user interface window of the first window creation unit 290.

The display unit 225 can be implemented by a cathode ray tube (CRT) or a liquid crystal display (LCD), and displays an operational condition of the user terminal 200 according to the signal from the graphic card 220.

The CPU 230 executes pre-stored driving programs and controls overall operations of the system. For example, upon receiving the fax request signal from the user input unit 210, the CPU 230 operates the fax driving unit 260 to display the fax setup menu so that a user can set up a fax condition.

The ROM 240, which is a nonvolatile memory device, contains control programs necessary for executing functions of the user terminal 200. For example, the ROM 240 contains a WINDOWS operating system provided from Microsoft Corporation. Other operating systems, such as LINUX operating system, may also be adopted.

The RAM 245, which is a volatile memory device, contains loaded programs to be executed by the CPU 230 or data processed by the CPU 230.

The application unit 250 contains application programs so that a user can write documents. Examples of the application may include word processors, database programs, Web browsers, development tools, drawing, paint, and image editing programs.

The fax driving unit 260 is provided with the fax driver. The fax driver is a program for operating the fax function of the first office machine 300, and transmits the fax data between the user terminal 200 and the first office machine 300.

To transmit the fax data, the fax driver converts a document to be transmitted to the second office machine 400 into the fax data, and provides the fax setup menu. The fax data conforms to a data format that the first office machine 300 can recognize. The fax setup menu is a user interface so that a user can set up fax information necessary for transmitting a particular document.

The fax information is classed into sender and recipient information. The sender information includes a name, a company, and a fax number of a sender. The recipient information includes a name, a company, and a fax number of a recipient. The fax information also includes a fax event instructing the first office machine 300 to transmit the converted fax data to the second office machine 400. The first office machine 300 recognizes based on the fax event included in the fax information that data received from the user terminal 200 is for the fax transmission. The fax information is created as a fax information event according to the fax protocol.

The fax driving unit 260 outputs to the spooler 270 the converted fax data and the created fax information event.

The spooler 270 is generally responsible for spooling print data created in a printer driving unit (not shown). According to an embodiment of the present general inventive concept, the spooler 270 outputs the fax data and the fax information event which are input from the fax driving unit 260, to the first communication interface unit 280. The fax information event is output just once at the beginning. Afterwards, only the fax data is transmitted by a predetermined data unit.

The first communication interface unit 280 is a communication interface unit to allow bi-directional communication with the first office machine 300 via a certain communication network. The first communication interface unit 280 transmits to the first office machine 300 the fax data and the fax information event output from the spooler 270, using the certain communication network.

The first communication interface unit 280 is provided with a transmission status event and a transmission completion event of the fax data which is being transmitted to the second office machine 400 from the first office machine 300. The transmission status event of the fax data indicates a transmission rate and a transmission progressing status relating to the fax data. The transmission completion event instructs that the transmission of the fax data is completed.

The first communication interface unit 280 is notified of fax reception information from the first office machine 300. Upon receiving the fax data from the second office machine 400, the first office machine 300 notifies the user terminal 200 of the reception of the fax data.

The communication monitor 285 checks a transmission status of the fax data from the first office machine 300 to the second office machine 400 by periodically monitoring the first communication interface unit 280 which is connected to the first office machine 300.

Specifically, the communication monitor 285 monitors the transmission rate, the transmission progress status, and the transmission completion relating to the fax data by checking the transmission status event and the transmission completion event which are transmitted from the first office machine 300 to the first communication interface unit 280. The monitored transmission status event and transmission completion event are output to the first window creation unit 290.

Figure 3A:
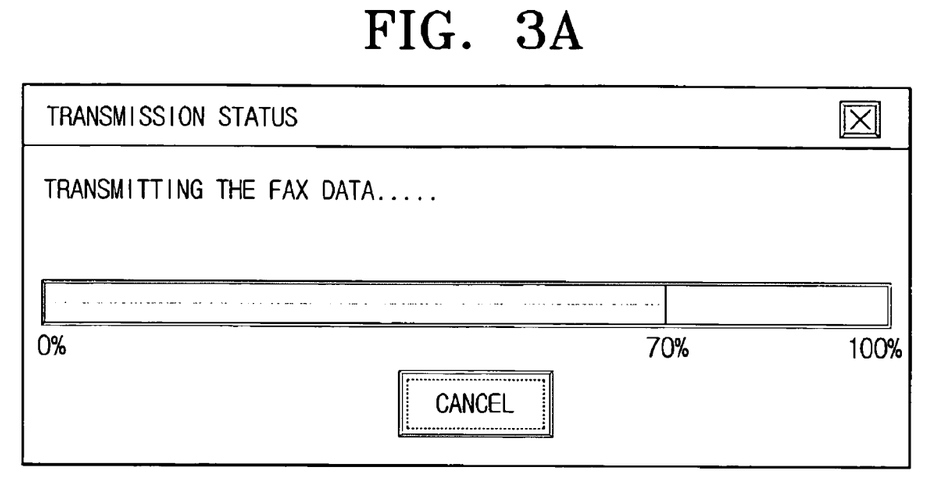
FIGS. 3A and 3B are views illustrating user interface windows created in a first window creation unit of FIG. 2.
Figure 3B:
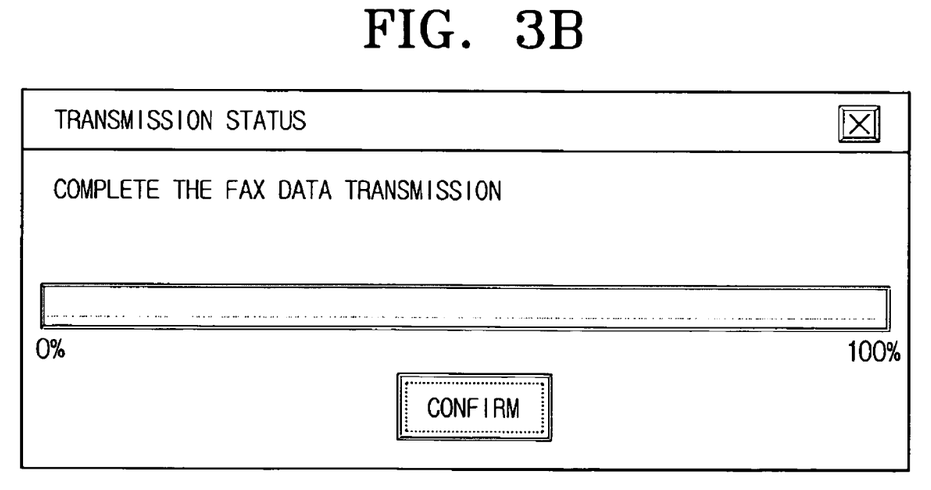

The first window creation unit 290 creates the user interface window based on the events provided from the communication monitor 285, as shown in FIGS. 3A and 3B. The first window creation unit 290 is implemented by a certain wizard which operates in association with the first office machine 300. The created user interface window is processed into the displayable signal by the graphic card 220 and displayed onto the display unit 225.

The user interface window of FIG. 3A, which is created based on the transmission status event, shows the transmission progress status of the fax data. The user interface window of FIG. 3B, which is created based on the transmission completion event, shows that the transmission of the fax data is completed. The user can perceive the transmission progress status of the fax data being transmitted to the second office machine 400, since the user interface window is displayed.

The first office machine 300 dials a fax number of the second office machine 400 based on the fax information event output from the first communication interface unit 280. After the configuration of communication line, the first office machine 300 transmits to the second office machine 400 the fax data output from the spooler 270 by a predetermined data unit. The first office machine 300 provides the first communication interface unit 280 with the transmission status event of the fax data consecutively or successively. When the transmission of the fax data is completed, the first office machine 300 provides the first communication interface unit 280 with the transmission completion event to indicate that transmission is completed.

The first office machine 300 includes an operational panel unit 305, a sensor 310, a scanner 320, a print engine unit 330, a second communication interface unit 340, a modem 350, a network control unit (NCU) 355, an event creation unit 360, a main storage 370, a sub-storage 375, and an office machine control unit 380.

The operational panel unit 310 has a key manipulation unit (not shown) and a display unit (not shown). If a user operates a function provided by the first office machine 300, the key manipulation unit outputs an operation signal to the office machine control unit 380. The display unit displays an operational status of the first office machine 300 under the control of the office machine control unit 380.

The sensor 310 senses a status of each component as the first office machine 300 operates, and provides the sensed status to the office machine control unit 380.

The scanner 320 reads image data by scanning a document. The read image data is printed by the print engine unit 330, and transmitted outside or stored in the sub-storage 375.

The print engine unit 330 performs the printing of a document.

The second communication interface unit 340 is connected with the first office machine 300 to allow a bidirectional communication. The second communication interface unit 340 receives the fax data and the fax information event from the user terminal 200. The received fax data is transmitted to the second office machine 400 based on the fax information event.

The modem 350 modulates the fax data to be transmitted to the second office machine 400, and demodulates the fax data transmitted from the second office machine 400. For example, the modem 350 modulates the fax data transmitted from the user terminal 200. The NCU 355 interconnects the PSTN and the modem 350 to establish contact with the second office machine 400. According to an embodiment of the present general inventive concept, the NCU 355 establishes contact with the second office machine 400 based on the fax number of the second office machine 400 which is included in the fax information event.

When the fax data begins to be transmitted to the second office machine 400, the event creation unit 360 creates the transmission status event and the transmission completion event using the fax protocol. The created events are transmitted to the first communication interface unit 280 of the user terminal 200 via the second communication interface unit 340.

The main storage 370, which is a nonvolatile memory device, contains a control program to implement functions of the first office machine 300, a firmware to execute the functions of the first office machine 300, and the fax protocol.

The sub-storage 375, which is a volatile memory device, contains data output while executing operations of the first office machine 300.

The office machine control unit 380 controls overall operations of the first office machine 300 according to the control program. According to an embodiment of the present general inventive concept, upon receiving the fax information event and the fax data from the user terminal 200, the office machine control unit 380 controls to dial the fax number of the second office machine 400 based on the fax information event, and controls the modem 350 and the NCU 355 to transmit the fax data to the second office machine 400.

As the fax data begins to be transmitted to the second office machine 400, the office machine control unit 380 controls the event creation unit 360 and the second communication interface unit 340 to generate and transmit the transmission status event to the first communication interface unit 280. As the fax data transmission is completed, the office machine control unit 380 controls the event creation unit 360 and the second communication interface unit 340 to generate and transmit the transmission completion event to the first communication interface unit 280.

Figure 4:
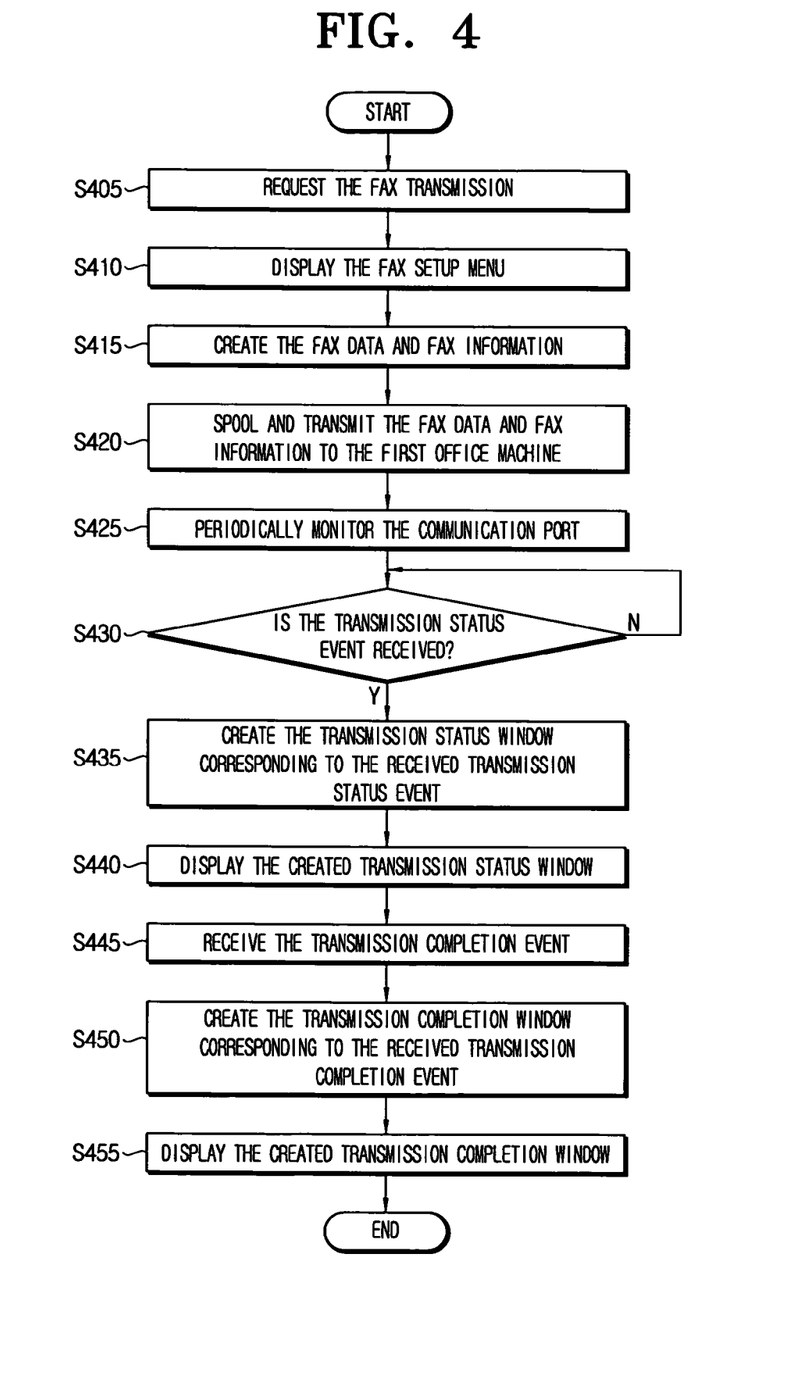
FIG. 4 is a flowchart illustrating a fax data transmission method of the fax data transmission system of FIG. 2.

FIG. 4 is a flowchart illustrating a fax data transmission method of the fax data transmission system of FIG. 2.

Referring to FIGS. 2 to 4, the first office machine 300 is connected with the user terminal 200, and the second office machine 400 is connected with the first office machine 300. The first and second office machine 300 and 400 provides various functions including the fax function.

Figure 5:
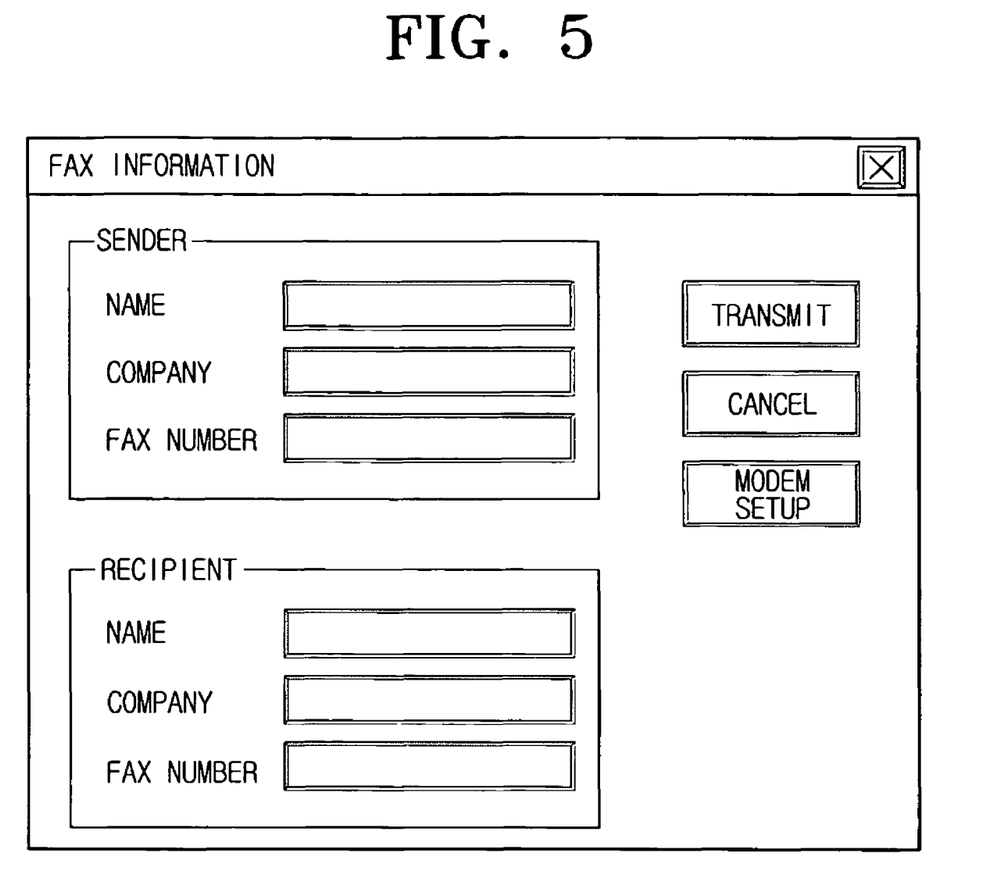
FIG. 5 is a view illustrating a window of a fax setup menu displayed by a fax driving unit of FIG. 2.

If the fax transmission of a certain document is requested from the user input unit 210 at operation S405, the CPU 230 operates the fax driving unit 260 to display the fax setup menu as shown in FIG. 5 at operation S410. After the fax setup menu is displayed, the sender information and the recipient information are input through the user input unit 210, and 'transmit' is selected, the fax driving unit 260 converts the certain document into the fax data and creates the fax information event at operation S415.

After the operation S415, the CPU 230 controls the spooler 270 and the first communication interface unit 280 to spool and transmit the fax data and the fax information event to the first office machine 300 at operation S420.

After the operation S420, the CPU 230 operates the communication monitor 285 to periodically monitor the first communication interface unit 280 which is connected to the first office machine 300 at operation S425.

When the first communication interface unit 280 confirms that the transmission status event is received from the first office machine 300 at operation S430, the CPU 230 operates the communication monitor 285 and the first window creation unit 290 to create the user interface window by providing the confirmed transmission status event to the first window creation unit 290 at operation S435. The user interface window created at operation S435 is the transmission status window as shown in FIG. 3A and varies in real-time according to the transmission status event. The created transmission status window is displayed onto the display unit 225 at operation S440.

After a predetermined time, if it is confirmed that the transmission completion event is received from the first office machine 300 at operation S445, the CPU 230 operates the communication monitor 285 and the first window creation unit 290 to create the user interface window by providing the confirmed transmission completion event to the first window creation unit 290 at operation S450. The user interface window of operation S450 is a transmission end window as shown in FIG. 3B and is created corresponding to the transmission completion event. The created transmission status window is displayed onto the display unit 225 at operation S455.

Figure 6:
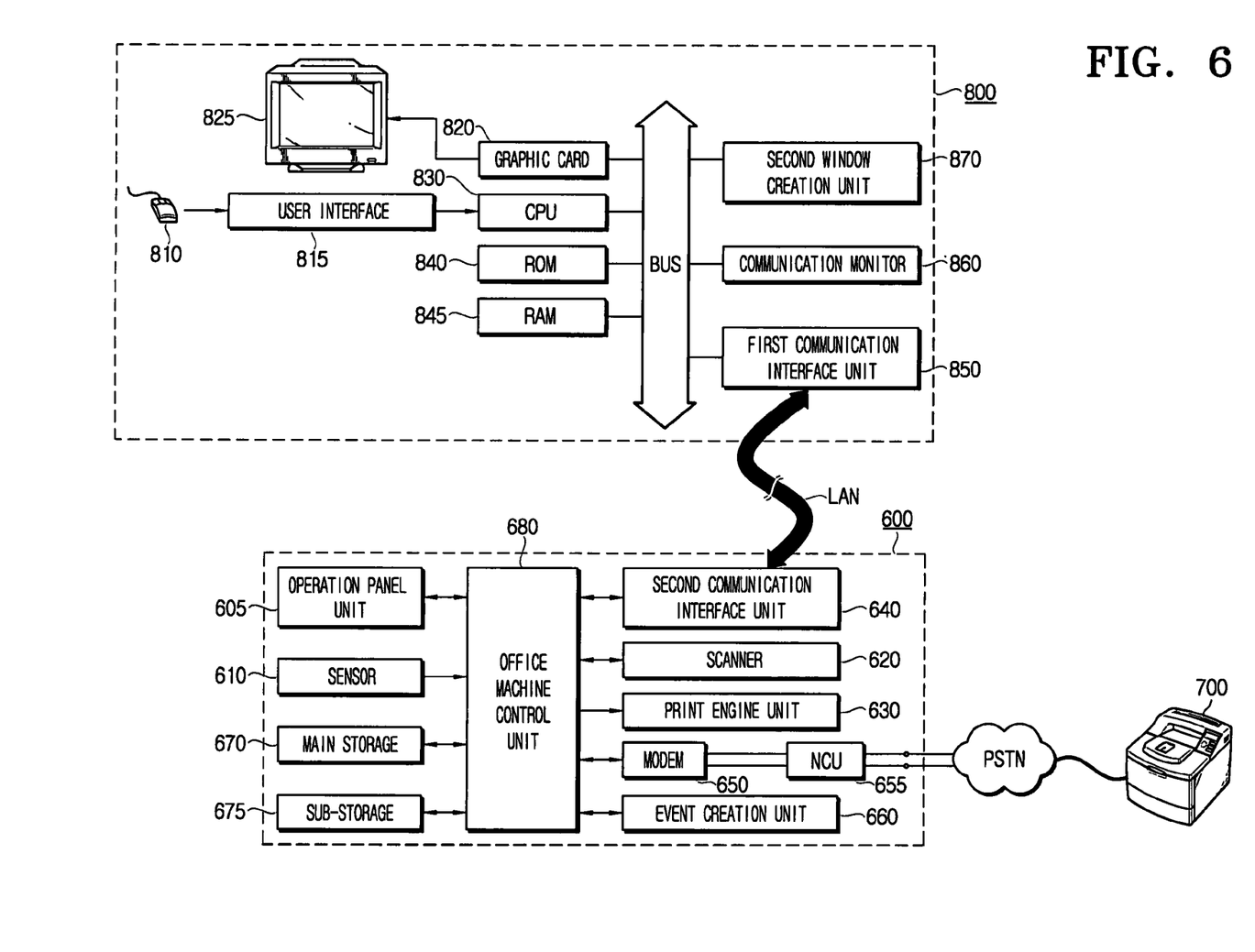
FIG. 6 is a schematic block diagram illustrating a fax system to transmit fax data according to another embodiment of the present general inventive concept.

FIG. 6 is a schematic block diagram illustrating a fax system capable of transmitting fax data according to another embodiment of the present general inventive concept.

Referring to FIG. 6, the fax system includes a third office machine 600, a fourth office machine 700, and a user terminal 800.

The third and fourth office machines 600 and 700 performs the same or similar functions as the first and the second office machines 300 and 400 of FIG. 2. According to this embodiment, the third office machine 600 loads to the user terminal 800 the fax data transmitted from the fourth office machine 700, and periodically transmits a loading status event which notifies a loading status of the fax data together with the fax data.

The user terminal 800 periodically checks the loading status event received from the third office machine 600, and confirms the loading status of the fax data which is being loaded from the third office machine 600. That is, the user terminal 800 which applies the fax data transmission device to transmit and receive the fax data according to another embodiment of the present general inventive concept, performs the fax data loading by checking only the event received from the third office machine 600.

For this operation, the third office machine 600 and the user terminal 800 communicate with each other using a predetermined fax protocol with respect to the third office machine 600. Accordingly, the fax data loading is performed without using a separate modem driver (not shown) to generate a standard protocol such as an AT command.

The third office machine 600 includes an operational panel unit 605, a sensor 610, a scanner 620, a print engine unit 630, a second communication interface unit 640, a modem 650, a network control unit (NCU) 655, an event creation unit 660, a main storage 670, a sub-storage 675, and an office machine control unit 680.

The operational panel unit 605, the sensor 610, the scanner 620, the print engine unit 630, the second communication interface unit 640, the modem 650, the NCU 655, the main storage 670, the sub-storage 675, and the office machine control unit 680 of FIG. 6 provide the similar functions as the those of FIG. 2, and will be omitted below for conciseness.

The fax data from the fourth office machine 700 is received by the NCU 655 and the modem 650 through a PSTN. The NCU 655 detects a fax number of the fourth office machine 700 which is a fax machine of the recipient. The modem 650 demodulates the received fax data. The demodulated fax data is contained into the sub-storage 675.

After the fax data is stored, the event creation unit 660 creates a request event and a loading status event. The request event requests the user terminal 800 to load the stored fax data. The loading status event notifies the loading status of the fax data which is being loaded to the user terminal 800.

The loading status event includes a loading start event, a loading progress event, and a loading completion event. Each event is created in accordance with the fax protocol.

Specifically, when the request event is transmitted and a response event is received from the user terminal 800 allowing the fax data loading, the event creation unit 660 creates the loading start event which notifies the loading start of the fax data.

When the fax data loading is started, the event creation unit 660 creates periodically the loading progress event corresponding to a loading progress state of the fax data. That is, the loading progress event notifies a loading progress status of the fax data.

When the fax data loading is completed, the event creation unit 660 creates the loading completion event which notifies the user terminal 800 of the loading completion of the fax data.

The created events are transmitted to the first communication interface unit 850 of the user terminal 800 via the second communication interface unit 640.

The office machine control unit 680 controls overall operations of the third office machine 600 according to a control program stored in the main storage 670. According to this embodiment, when the fax data is received from the fourth office machine 700, the office machine control unit 680 controls the event creation unit 660 and the second communication interface unit 640 to create and transmit the request event to the user terminal 800. When the fax data loading is started, the office machine control unit 680 controls the event creation unit 660 and the second communication interface unit 640 to transmit to the user terminal 800 the loading status event for notifying the loading status of the fax data.

The user terminal 800 includes a user input unit 810, a user interface 815, a graphic card 820, a display unit 825, a CPU 830, a ROM 840, a RAM 845, a first communication interface unit 850, a communication monitor 860, and a second window creation unit 870. A bus is a data transmission path between the above components.

The user input unit 810, the user interface 815, the graphic card 820, the display unit 825, the CPU 830, the ROM 840, and the RAM 845 provides the similar functions as those of FIG. 2, and will not be described below for conciseness.

The first communication interface unit 850 receives the request event and loading status event from the third office machine 600.

The communication monitor 860 periodically monitors the first communication interface unit 850, and generates the response event to allow the fax data loading when the reception of the request event is confirmed. When the reception of the loading status event is confirmed after a predetermined time, the communication monitor 860 provides the confirmed loading status event to the second window creation unit 870. As described above, the loading status event includes the loading start event, the loading progress event, and the loading completion event. When the fax data loading is completed, the communication monitor 860 generates an event to the third office machine 600 to notify the normal completion of the fax data loading.

If an operating system of the user terminal 800 is based on the WINDOWS operating system, for example, the second window creation unit 870 may be operated by a program registered in Window System Tray.

The second window creation unit 870 creates a user interface window showing the loading status of the fax data based on the confirmed loading status event. The created user interface window is signal-processed by the graphic card 820 and displayed onto the display unit 825.

In more detail, upon receiving the response event generated in the communication monitor 860 via the first and second communication interface units 850 and 640, the third office machine 600 transmits the loading start event to the first communication interface unit 850, and starts to load the fax data.

The communication monitor 860 provides the second window creation unit 870 with the loading start event which is confirmed in the first communication interface unit 850. The second window creation unit 870 creates the user interface window based on the loading start event as shown in FIG. 7A.

Figure 7A:
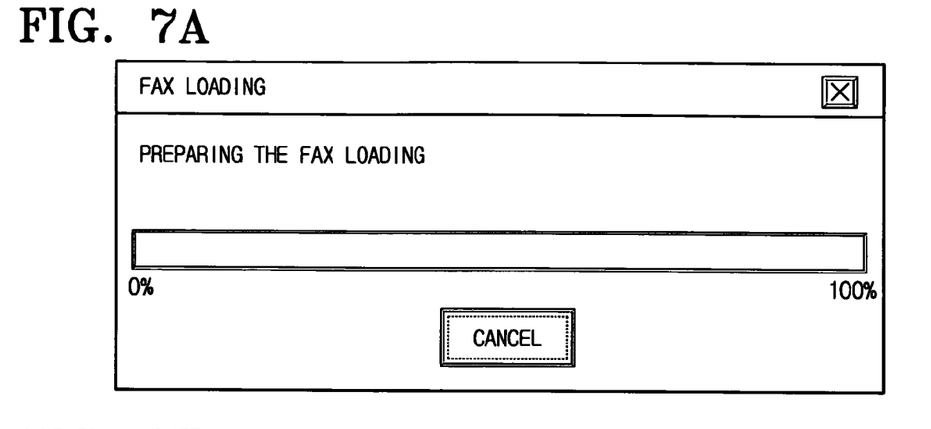
FIGS. 7A through 7C are views illustrating user interface windows created in the second window creation unit of FIG. 6.
Figure 7B:
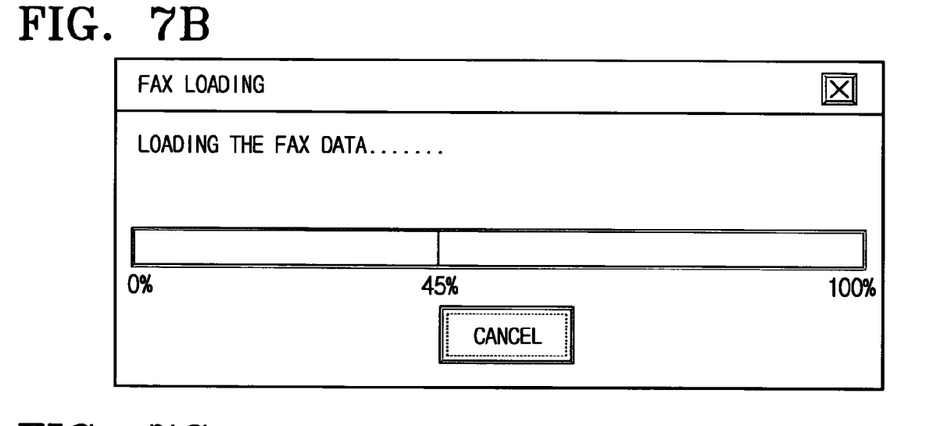
Figure 7C:
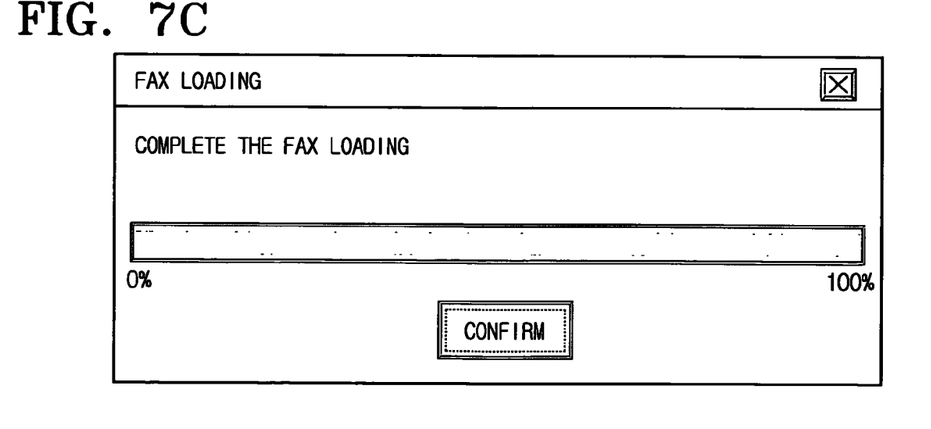

The user interface windows as shown in FIGS. 7A to 7C are signal-processed in the graphic card 820 and displayed onto the display unit 825.

While loading the fax data into the user terminal 800, the third office machine 600 generates the loading progress event periodically. Accordingly, the communication monitor 860, which monitors the first communication interface unit 850 periodically, provides the confirmed loading progress event to the second window creation unit 870. The second window creation unit 870 creates the user interface window in correspondence to the provided loading progress event. For example, if the provided loading progress event instructs the current transmission rate of 45%, the second window creation unit 870 creates the user interface window as shown in FIG. 7B. The window of FIG. 7B periodically changes according to the loading progress event.

Upon receiving the loading completion event from the third office machine 600, the communication monitor 860 provides the confirmed loading completion event to the second window creation unit 870. The second window creation unit 870 creates the user interface window based on the loading completion event, as shown in FIG. 7C. Hence, a user can perceive easily the loading start, the transmission progress, and the loading completion of the fax data.

The fax data, which is loaded from the third office machine 600 together with the loading start event, is contained in a storage medium, for example, the RAM 845.

Figure 8:
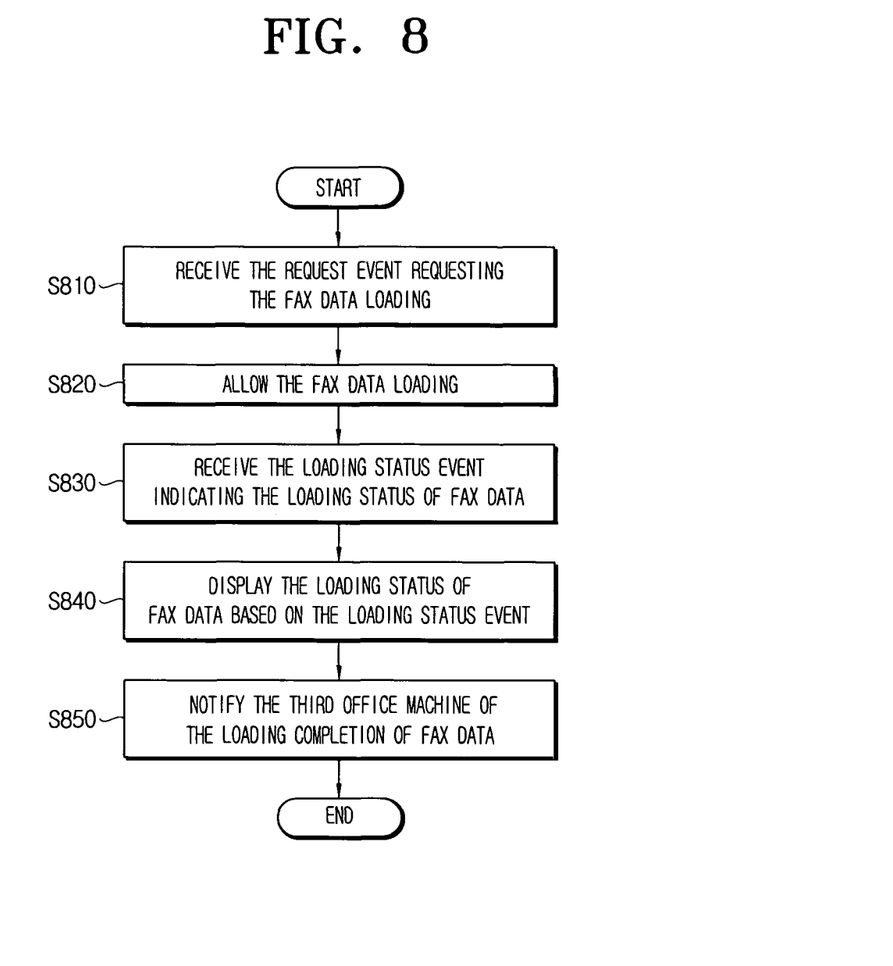
FIG. 8 is a flowchart illustrating a fax data transmission method of the fax data transmission system of FIG. 6.

FIG. 8 is a flowchart illustrating a fax data transmission method of the fax data transmission system of FIG. 6.

Referring to FIGS. 6 through 8, the third office machine 600 is connected with the user terminal 800, and the fourth office machine 700 is connected with the third office machine 600. The third and fourth office machine 600 and 700 provide various services including the fax service.

When the fax data is transmitted from the fourth office machine 700 to the third office machine 600, the third office machine 600 generates and transmits the request event to the first communication interface unit 850. Upon confirming the reception of the request event by monitoring the first communication interface unit 850 periodically at operation S810, the communication monitor 860 allows the loading of the fax data at operation S820.

After a predetermined time, the third office machine 600 transmits the loading progress event and the fax data to the first communication interface unit 850. The CPU 830 processes to contain the fax data transmitted to the first communication interface unit 850, into the storage medium of the user terminal 800.

Upon confirming the loading progress event transmitted from the third office machine 600, the communication monitor 860 provides the confirmed loading progress event to the second window creation unit 870 at operation S830. The CPU 830 operates the second window creation unit 870 to create the user interface window showing the loading status of the fax data based on the confirmed loading status event at step S840.

The loading status event confirmed at operation S830 includes the loading start event, the loading progress event, and the loading completion event. The user interface window created at operation S840 is displayed onto the display unit 825 via the graphic card 820. Examples of the user interface window are illustrated in FIGS. 7A to 7C.

After operation S840, when the loading completion event is received, the communication monitor 860 notifies the third office machine 600 of the loading completion of the fax data at step S850.

Referring back to FIGS. 2 and 6, the fax system has been described as an example. FIG. 2 illustrates a case in which the document written in the user terminal 200 is transmitted to the first office machine 300. FIG. 6 illustrates another case in which the user terminal 800 receives the document transmitted from the fourth office machine 700 to the third office machine 600.

It will be understood that the user terminals 200 of FIGS. 2 and 800 of FIG. 6 may be operated in a single user terminal. For example, the single user terminal may transmit first fax data to an external office machine (not shown) and also receive second fax data from the external office machine.

In the light of the foregoing, data communication errors which arise between a host computer and an office machine, are reduced as the separate protocol is used between the host computer and the office machine in lieu of the AT command created in the modem driver. As a result, the fax data is transmitted and received between the office machines, and the host computer confirms only the transmission status of the fax data, to thus reduce errors.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A data processing device coupled to a first office machine operable to transmit fax data via the first office machine, comprising:
   a fax driving unit to convert a certain document into fax data recognizable by the first office machine, and to create a fax information event including a fax event which instructs to transmit the converted fax data to a second office machine, and a fax number of the second office machine;
   a spooler to spool the converted fax data;
   a communication interface unit to transmit the spooled fax data and the fax information event to the first office machine which is communicatingly connected with the communication interface unit, and to receive fax data and fax information from the first office machine; and
   a window creation unit to create a user interface window to indicate a transmission status event that includes at least one of a transmission rate and a transmission progressing status during transmission of the fax data from the first office machine to the second office machine and upon completion of the transmission of the fax data, the user interface window to indicate a transmission completion event of the fax data, and when the first office machine has received the fax data from the second office machine, the user interface window directly displays on the data processing device, without receiving user input, a fax data loading event from the first office machine to the data processing device when the fax data loading event is received by the data processing device via a fax protocol,
   wherein, when the first office machine executes the transmission of the fax data to the second office machine based on the transmitted fax information event the communication interface unit receives a transmission status event of the fax data periodically or continuously from the first office machine while the fax data is transmitted from the first office machine to the second office machine and the window creation unit updates the user interface window indicating a status of the fax data transmission based on the received transmission status event,
   wherein the window creation unit updates the user interface window indicating the status of the fax data loading event according to a reception status event.

2. The device of claim 1, further comprising:
   a communication monitor to confirm the transmission status event of the fax data transmitted from the first office machine to the second office machine by periodically monitoring the communication interface unit such that the user interface window shows the confirmed transmission status; and
   a display unit to display the created user interface window.

3. The device of claim 2, wherein the first office machine periodically provides the transmission status event to the communication interface unit when the fax data begins to be transmitted to the second office machine.

4. The device of claim 1, wherein the fax information event further includes at least one of a fax number of the first office machine, and a sender name and a recipient name.

5. The device of claim 1, wherein the communication interface unit does not communicate with the first office machine using an attention (AT) command.

6. A data transmission method of transmitting data from a user terminal to a second office machine through a first office machine, comprising:
   converting a document into fax data recognizable by the first office machine;
   creating a fax information event including a fax event which instructs to transmit the converted fax data to the second office machine and a fax number of the second office machine;
   spooling the converted fax data;
   transmitting the spooled fax data and the fax information event to the first office machine, and receiving fax data and fax information from the first office machine;
   generating a user interface window to indicate a transmission status event that includes at least one of a transmission rate and a transmission progressing status during transmission of the fax data from the first office machine to the second office machine and upon completion of the transmission of the fax data, the user interface window indicating a transmission completion event of the fax data, and when the first office machine has received the fax data from the second office machine, the user interface window directly displays on the user terminal, without receiving user input, a fax data loading event from the first office machine to the user terminal when the fax data loading event is received by the user terminal via a fax protocol;
   receiving a transmission status event of the fax data periodically or continuously from the first office machine while the fax data is transmitted from the first office machine to the second office machine; and
   updating the user interface window indicating a status of the fax data transmission based on the received transmission status event and a received fax data loading event according to a reception status event.

7. The method of claim 6,
wherein the spooling of the converted fax data and the outputting of the spooled fax data and the created fax information event are performed in a spooler.

8. The method of claim 6, further comprising:
periodically monitoring a reception of a transmission status event indicating a transmission status of the fax data which is transmitted from the first office machine to the second office machine;
creating a user interface window based on the monitored transmission status event; and
displaying the created user interface window.

9. The method of claim 6, wherein the creating of the fax information comprises creating at least one of a fax number of the first office machine and a sender name and a recipient name as the fax information.

10. A data processing device coupled to a first office machine operable to load fax data transmitted from a second office machine to the first office machine, comprising:
a communication interface unit communicatingly connected with the first office machine to receive from the first office machine a request event which requests a loading of fax data when the first office machine receives fax data from the second office machine and a loading status event which notifies a loading status including progress of loading the fax data when the fax data is loaded from the first office machine to the data processing device via the communication interface unit;
a window creation unit to create a user interface window to directly display on the data processing device, without receiving user input, the loading status of the fax data based on the loading status event from the first office machine to the data processing device when the loading status event is received by the data processing device via a fax protocol,
wherein the fax data loading is performed without using a separate modem driver to generate a standard fax communication protocol and with the same communication interface unit that receives events,
wherein the first office machine provides the communication interface unit with a loading status event of the fax data periodically while the fax data is loaded from the first office machine to the data processing device.

11. The device of claim 10, further comprising:
a display unit to display the created user interface window; and
a communication monitor to allow the fax data loading when a reception of the request event is confirmed by periodically monitoring the communication interface unit, and to confirm the loading status event which is received after a predetermined time.

12. The device of claim 10, wherein the loading status event comprises a loading start event which instructs to start the fax data loading when the communication monitor allows the loading, a loading progress event which instructs a loading progress status of the fax data, and a loading completion event which instructs a loading completion of the fax data.

13. The device of claim 12, wherein the first office machine periodically provides to the communication interface unit the loading progress event corresponding to the loading progress status of the fax data when the fax data loading is started.

14. The device of claim 10, wherein the communication interface unit does not communicate with the first office machine using an attention (AT) command.

15. A method for use in a data processing device to load fax data which is transmitted from a second office machine to a first office machine which is communicatingly connected with the second office machine, comprising:
receiving a request event which requests a loading of fax data when the first office machine has received fax data from the second office machine;
allowing the fax data to be loaded from the first office machine to the data processing device
displaying a user interface window that directly displays on the data processing device, without receiving user input, a loading status of the fax data being loaded from the first office machine to the data processing device based on a loading status event received by the data processing device via a fax protocol,
wherein the fax data loading is performed without using a separate modem driver to generate a standard fax communication protocol and with a same communication interface unit that receives events,
wherein the first office machine provides the loading status event including progress of loading the fax data periodically to the data processing device while the fax data is being loaded from the first office machine to the data processing device.

16. The method of claim 15, further comprising:
confirming a loading status event which instructs a loading status of the fax data transmitted from the first office machine after the first office machine has completely received the fax data from the second office machine.

17. The method of claim 15, wherein the loading status event includes a loading start event which instructs to start the fax data loading, a loading progress event which instructs a loading progress status of the fax data, and a loading completion event which instructs a loading completion of the fax data.

18. The method of claim 17, wherein the first office machine periodically transmits the loading progress event corresponding to the loading progress status of the fax data when the fax data loading is started.

19. A non-transitory computer readable medium storing executable computer program instructions which, when executed by a data processing device, causes the data processing device to perform a method comprising:
converting a document into fax data recognizable by a first office machine, and generating a fax information event including a fax event which instructs to transmit the converted fax data to a second office machine, and a fax number of the second office machine;
spooling the converted fax data;
transmitting the spooled fax data and the fax information event to a first office machine, and receiving fax data and fax information from the first office machine;
generating a user interface window to indicate a transmission status event that includes at least one of a transmission rate and a transmission progressing status during transmission of the fax data and upon completion of the transmission of the fax data, and a transmission completion event of the fax data that includes the total amount of the fax data transmitted from the first office machine to the second office machine, and when the first office machine has received the fax data from the second office machine, the user interface window directly displays on a user terminal, without receiving user input, a fax data loading event from the first office machine to the user terminal when the fax data loading event is received by the terminal via a fax protocol;
receiving a transmission status event of the fax data periodically or continuously from the first office machine while the fax data is transmitted from the first office machine to the second office machine; and updating the user interface window indicating a status of the fax data transmission based on the received transmission status event and a received fax data loading event according to a reception status event.

20. A non-transitory computer readable medium storing executable computer program instructions which, when executed by a data processing device coupled to a first office machine, causes the data processing device to perform a method comprising:

receiving a request event which requests a loading of fax data when the first office machine has received fax data from a second office machine;

allowing the fax data to be loaded from the first office machine to the data processing device; and displaying a user interface window that directly displays on the data processing device, without receiving user input, a loading status of the fax data being loaded from the first office machine to the data processing device based on a loading status event received by the data processing device via a fax protocol, wherein the fax data loading is performed without using a separate modem driver to generate a standard fax communication protocol and with a same communication interface unit that receives events, and wherein the first office machine provides the loading status event including progress of loading the fax data periodically to the data processing device while the fax data is being loaded from the first office machine to the data processing device.

* * * * *